United States Patent [19]

Jeffcoat

[11] Patent Number: 5,749,247
[45] Date of Patent: May 12, 1998

[54] KNITTED COVER AND A KNITTING METHOD

[75] Inventor: Keith Jeffcoat, Nuneaton, United Kingdom

[73] Assignee: General Motors Corporation, Detroit, Mich.

[21] Appl. No.: 704,443

[22] Filed: Aug. 23, 1996

Related U.S. Application Data

[62] Division of Ser. No. 546,262, Oct. 20, 1995, Pat. No. 5,577,398.

[30] Foreign Application Priority Data

Nov. 10, 1994 [GB] United Kingdom ............... 9422650

[51] Int. Cl.$^6$ .................................................. D04B 1/22
[52] U.S. Cl. ........................... 66/198; 66/170; 66/64
[58] Field of Search .................. 66/171, 177, 178 R, 66/183, 198, 64; 2/239, 240, 247

[56] References Cited

U.S. PATENT DOCUMENTS

| | | | |
|---|---|---|---|
| 3,252,306 | 5/1966 | Bentley et al. | 66/89 |
| 4,100,769 | 7/1978 | Nurk | 66/177 |
| 4,445,233 | 5/1984 | Rubin | 2/247 X |
| 4,961,235 | 10/1990 | Willinger | 2/239 |
| 5,038,585 | 8/1991 | Robinson et al. | 66/170 |
| 5,125,117 | 6/1992 | Buenos et al. | 2/239 |
| 5,127,242 | 7/1992 | Misumoto | 66/177 R X |
| 5,133,091 | 7/1992 | Del Valle Mas | 2/247 X |
| 5,163,306 | 11/1992 | Boehm et al. | 66/177 |
| 5,213,863 | 5/1993 | Day et al. | 428/71 |
| 5,215,807 | 6/1993 | Day et al. | 428/193 |
| 5,230,333 | 7/1993 | Yates et al. | 2/239 X |
| 5,253,492 | 10/1993 | Mitsumoto | 66/69 |
| 5,308,141 | 5/1994 | Robinson et al. | 297/218 |
| 5,325,545 | 7/1994 | Hirano | 66/178 R X |
| 5,326,150 | 7/1994 | Robinson et al. | 297/218 |
| 5,375,265 | 12/1994 | Selzer | 66/171 X |
| 5,651,142 | 7/1997 | Del Valle Mas | 2/239 |

FOREIGN PATENT DOCUMENTS

| | | |
|---|---|---|
| 1339423 | 12/1973 | United Kingdom. |
| 2206609A | 1/1989 | United Kingdom. |
| 2223034A | 3/1990 | United Kingdom. |
| 2223036A | 3/1990 | United Kingdom. |
| 2253219A | 9/1992 | United Kingdom. |

*Primary Examiner*—John J. Calvert
*Attorney, Agent, or Firm*—George A. Grove

[57] ABSTRACT

A three-dimensional continuously weft knitted fabric cover characterized by a wale-wise orientated pouch and a method of knitting the same, in which a knitting pattern for knitting the fabric cover in a single operation is made by forming a two-dimensional development of the object and the pouch, determining the wale-wise direction for knitting, performing a geometric rearrangement on the two-dimensional development so that any non-horizontal edges to be joined together in the knitting operation have the same length, and said edges are biased at equal angles to the course-wise direction.

8 Claims, 11 Drawing Sheets

Fig.3(a)
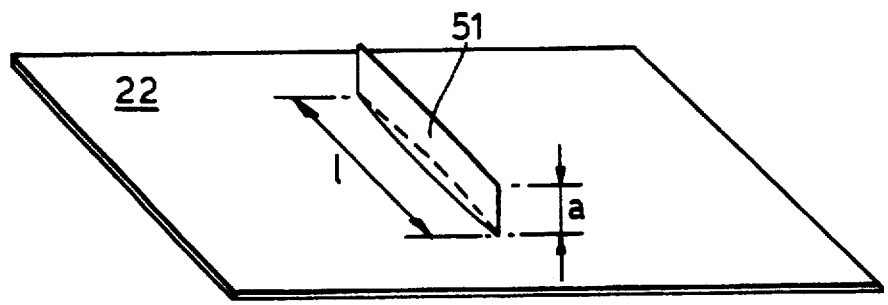
Fig.3(b)
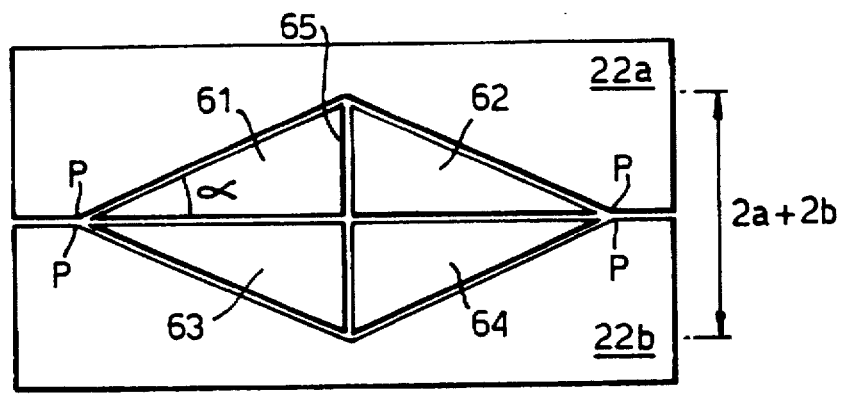
Fig.3(c)
Fig.3(d)

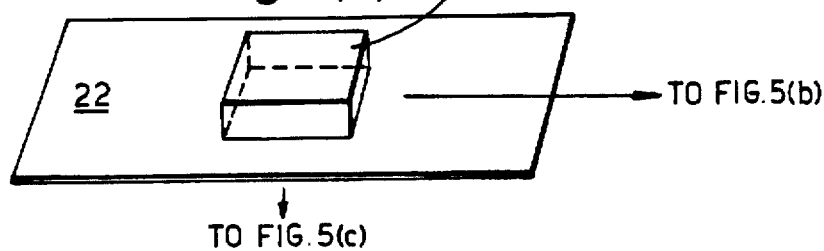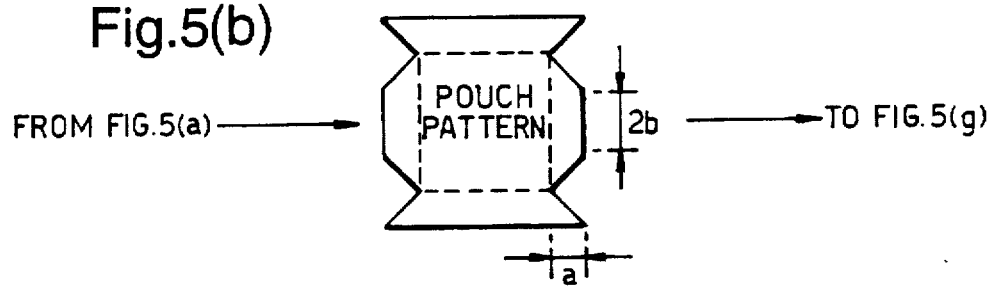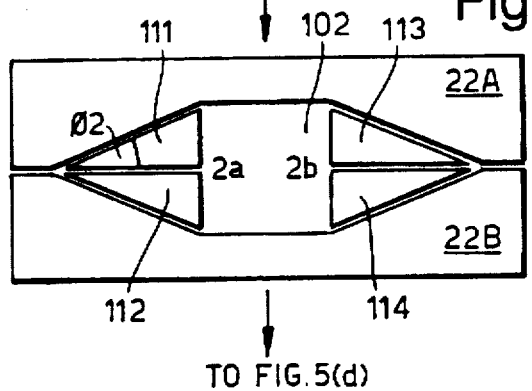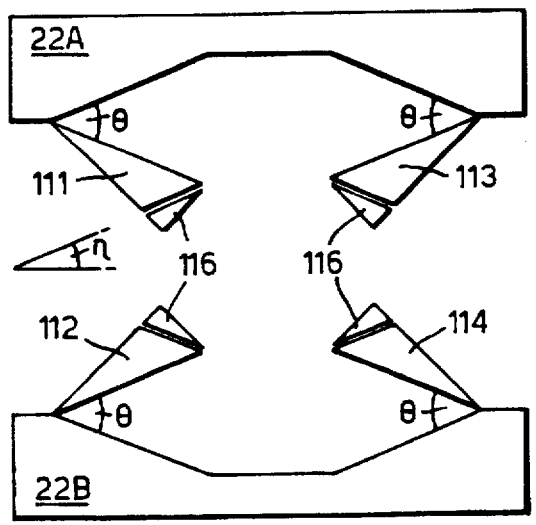

KNITTED COVER AND A KNITTING METHOD

This is a division of application Ser. No. 08/546,262 filed on Oct. 20, 1995 now U.S. Pat. No. 5,577,398, filed on Oct. 20, 1995 and issued on Nov. 26, 1996.

FIELD OF THE INVENTION

This invention relates to a knitted fabric cover and a method of continuously knitting a fabric cover for a three-dimensional object, the whole cover being formed in a single operation requiring no further sewing or processing.

BACKGROUND OF THE INVENTION

The invention is useful in machine knitting on a weft knitting machine having independently operable needles disposed in at least two needle beds, for example, a flat V-bed machine producing a mainly double jersey structure. In such machines, the width of the knitted fabric is restricted by the maximum number of needles available for forming a course across the machine bed.

Three-dimensional fabric structures for covering three-dimensional objects have in the past been produced by weaving and knitting shaped parts and panels and sewing them together.

More recently, it has been found possible to knit one-piece upholstery fabric, which removes the need for sewing portions together, and has the desired shape to serve as covers for the base and back cushions for vehicle seats; see, for example, British Patent 2,223,034. A problem that has arisen with the continuous knitting of three-dimensional fabric structures is that it has hitherto been impossible without specialized machines to knit fabrics which include vertically orientated pouches or protrusions, that is, protrusions which are orientated in a substantially wale-wise or vertical direction. This problem arises because a pouch orientated in a vertical direction has transverse surface dimensions which are longer than the distance across the width of the available needle bed. This is analogous to distances on the ground in mountains being further than the measured flat map distances.

Another consideration in making knitting patterns is that the edges-to-be-joined should have the same length, and any angle between them should be equally bisected by a horizontal line. Shaping can be achieved with edges of different lengths and asymmetrically bisected angles but the joins will be distorted.

Furthermore, in the preparation of the pattern, the angle between edges-to-be-joined should not be too large, and it is generally considered that a maximum angle should lie in the range of 90° up to 135°, depending on the application. British Patent Application GB-A-2,223,036 discusses this problem.

SUMMARY OF THE INVENTION

The present invention provides a means for continuous knitting of three-dimensional knitted objects which includes vertically orientated pouches or protrusions.

According to this invention, there is provided a three-dimensional continuously weft knitted fabric cover having a wale-wise orientated pouch. A wale-wise pouch is a pouch having a major axis extending in the direction of the wales in the knitted cover. The pouch may be formed in a flat panel and is flanked on each side by suture lines which extend away from the pouch on each side thereof to intersect at one or more points remote from the pouch.

Also according to the invention, there is provided a knitting pattern for continuously knitting a three-dimensional fabric cover having a wale-wise orientated pouch, said knitting pattern comprising a two-dimensional blank having a portion which is a development of the pouch and further portions separated from each other by the central portion and linked thereto by pairs of arms having edges which form suture lines in the fabric cover and which intersect at a point connecting said arms to said further portions.

Preferably, any non-horizontal linear edges-to-be-joined have the same length and are biased at equal angles to a horizontal line. By horizontal is meant in a course-wise direction of the fabric-to-be-knitted.

Yet another aspect of the invention comprises a method for determining the shape of a knitting pattern for continuous knitting in a single operation of a three-dimensional weft knitted cover having a wale-wise orientated pouch, said method comprising forming a two-dimensional development of the object including the pouch, determining the wale-wise direction for knitting and performing a geometric rearrangement on the two-dimensional development so that any non-horizontal edges to be joined together in the knitting operation have the same length, and said edges are biased at equal angles to the course-wise direction.

Preferably, the invention includes a method of determining the shape of a knitting pattern as described above in which the cover includes a substantially flat panel with a pouch formed therein, wherein the knitting pattern is formed by separately making a development of the pouch which undergoes geometric rearrangement to produce a pattern for the pouch itself, making a development of the panel without the pouch, performing a geometric rearrangement on the panel development, and connecting the two developments together through the geometrically rearranged portions.

A further aspect of the invention relates to a method of knitting in a single operation a three-dimensional cover having a wale-wise orientated pouch wherein said method includes making a pattern according to the present invention and/or taking a knitted pattern also according to the present invention, and continuously knitting the cover to said pattern with the edges being joined during the knitting operation.

BRIEF DESCRIPTION OF DRAWINGS

FIGS. 5(a)–5(g) disclose an alternative method of producing the pouch of FIG. 4;

DESCRIPTION OF THE PREFERRED EMBODIMENT

Figure 1:
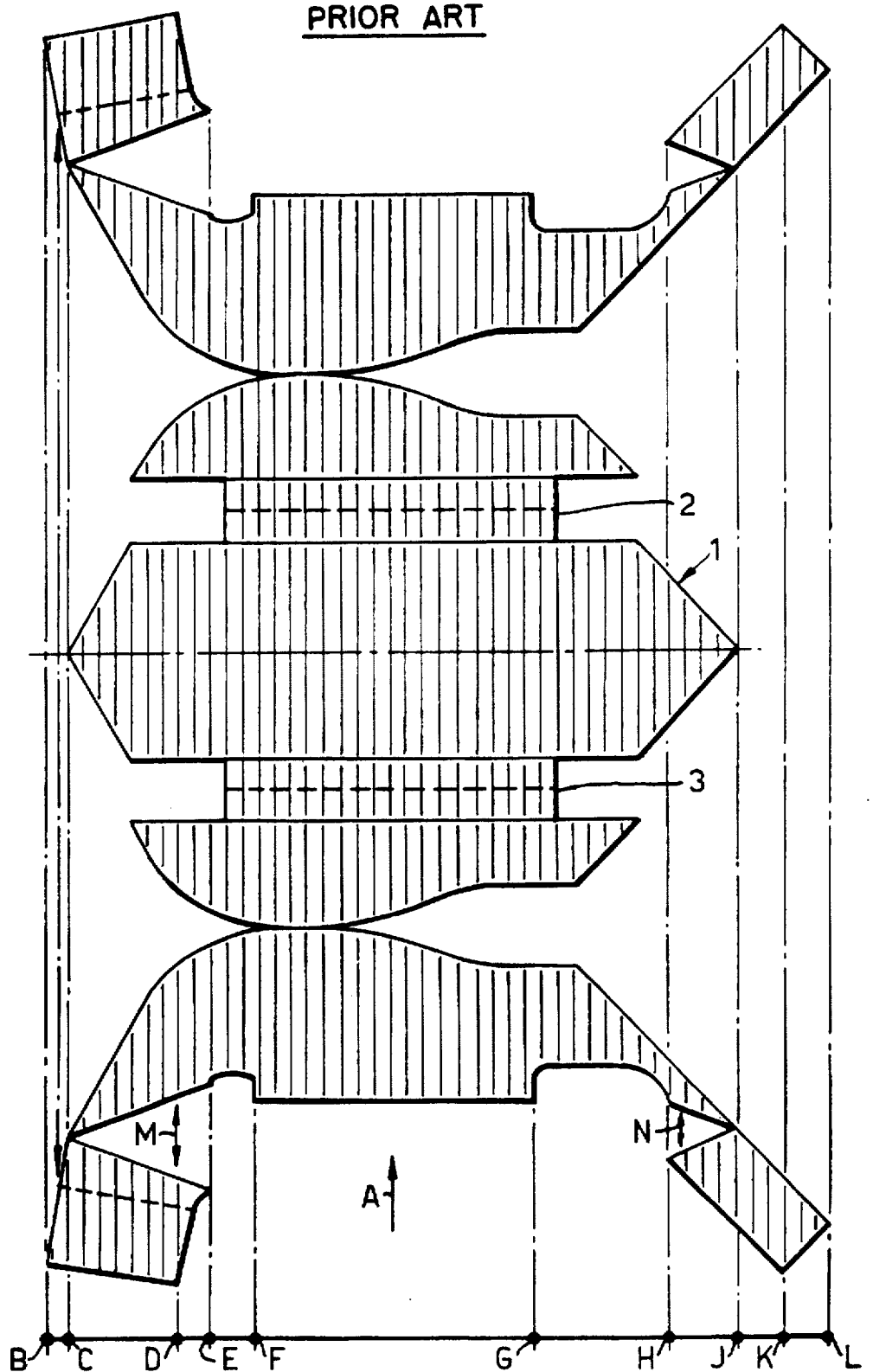
FIG. 1 discloses a known knitting pattern for a seat cushion.

FIG. 1 is a prior art diagram taken from EP-A-361,855 showing one way in which a fabric piece 1 for covering a seat base of an automobile seat can be continuously weft knitted in a single operation. The fabric piece 1 is of mainly double jersey structure and is knitted on a flat V-bed knitting machine provided with a conventional presser foot device and/or other loop hold-down device for holding down the knitted fabric between the opposed needle beds of the machine. The direction of knitting, indicated by arms A, is such that the wales of the fabric piece extend in a desired manner across the seat base. This may be dictated by a pattern on the fabric or by other technical considerations.

The knitting of the fabric piece 1 is described in detail in GB-A-2,223,034 and will only be described herein so as to give background information for understanding the present invention.

In FIG. 1, the line B-L represents the length of an opposed needle bed of the machine in which the piece 1 is knitted. The needles operate to form fabric along vertical lines only (that is, in wales). Essentially, the knitting begins on a few needles at point D on the needle bed and more needles are brought progressively into action course-by-wale in the direction from D-B and from D-E to begin to define the edges of the material. Similarly, knitting will commence at point K with needles being brought progressively into action from K-H and from K-L. The needles are then made progressively active and/or inactive in order to obtain the required shape of the fabric.

During the continuous knitting operation from bottom to top of the fabric, edges of the fabric as indicated by double ended arrows are knitted together. Taking the two edges indicated by double-headed arrows M and N, for example, this requires that needles made inactive between points C and E, and H and J, respectively, are progressively reactivated to "join" the two edges indicated by M and N along vertical lines.

The areas 2 and 3 may be knitted on one needle bed only to form integral open ended loops or may be utilized by folding along the dotted lines for forming open ended loops beneath the seat cover for facilitating incorporation of the cover into a seat.

It will be apparent that during the knitting operation only those points that lie on a vertical line (a needle line) on a joint can be integrally linked together.

Therefore, if it is necessary to have a vertically orientated pouch located in the middle of a panel, then this has hitherto been considered impossible because of the problems associated with creating extra pouch material within the constraints of a fixed number of needles in the needle bed.

The means whereby vertical (by vertical is meant in a wale-wise direction in the knitted fabric) pouches can be incorporated into a fabric panel will be discussed by way of example to several basic simple pouch shapes. These examples are non-limitative and for the purposes of explanation only.

Figure 2A:
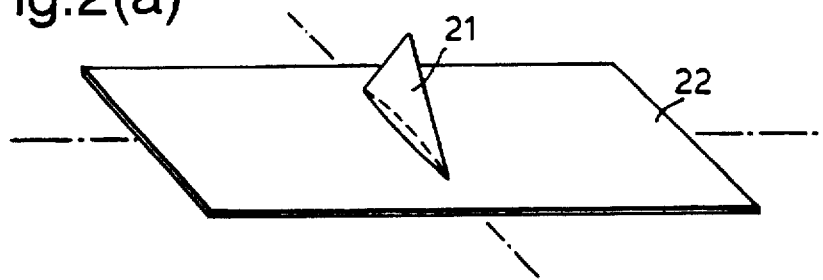
FIGS. 2(a)–2(i) disclose a first embodiment of the present invention.

Referring to FIG. 2, there is shown in FIG. 2a a knitted fabric cover including a vertically orientated narrow triangular pouch 21 incorporated into a flat weft knitted panel 22. The panel may be part of a larger structure such as a seat cover similar to that described with reference to FIG. 1.

In order to continuously knit the panel 22 and pouch 21, it is necessary to develop a knitting pattern (see FIG. 2h) which will allow for the formation of the pouch 21 from an essentially flat two-dimensional blank merely by joining together all the edges of a flat area as the knitting proceeds.

Figure 2B:
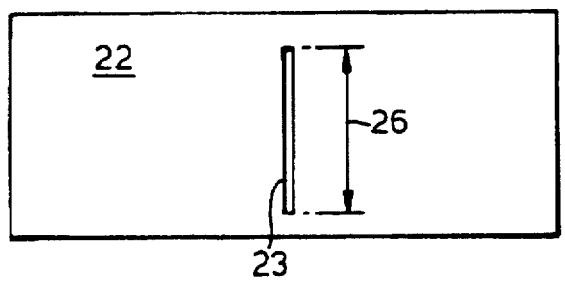
Figure 2C:
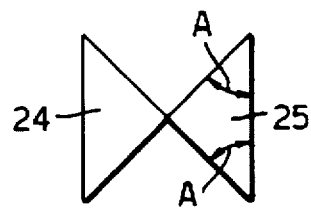

The shape of the pattern is derived as follows:

(a) The pouch 21 is notionally split-off from the panel 22, which produces two separate developments: the flat development of the panel 21 shown in FIG. 2b and the flat development of the triangular pouch shown in FIG. 2c. The panel 22 shows a vertical split 23 into which the pouch 21 is incorporated. The split has a vertical length 2×L.

Figure 2D:
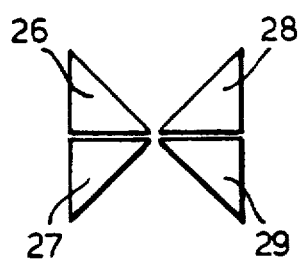
Figure 2E:
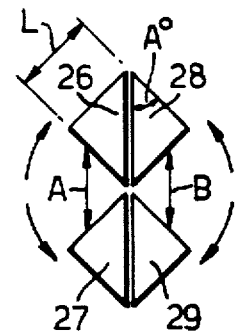
Figure 2F:
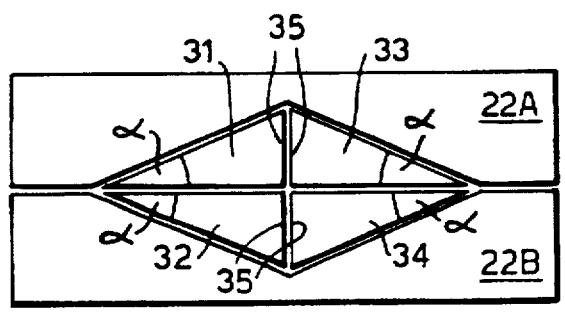

(b) The pouch development 2c must itself be formed into its knitting pattern 2e by undergoing geometric rearrangement. The two sides 24,25 of the triangular pouch are in the form of isosceles triangles with a base angle A° and are split horizontally through their apices, forming the triangular portions 26–29, as shown in FIG. 2d, which are swung out as shown in FIG. 2e to form a pattern. The pairs of edges-to-be-joined indicated by double headed arrows A and B have the same length and are bisected horizontally so that the edges are at equal angular bias to the horizontal line. The outer sides of the triangular portions 26–29 have a length L and the triangular portions have an apex angle of A°.

(c) The development of the panel 22 also separately undergoes a geometric rearrangement. The panel 22 is split horizontally into two parts 22A, 22B and congruent triangular arms 31–34 split from the panel. The triangular arms 31–34 have horizontal sides formed by the horizontal split and a base 35 normal to the horizontal side of length L which corresponds with half the length "2×L" of the pattern for the pouch 21, and the angle μ at the apex of the four triangles is such that α=A°/2.

Figure 2G:
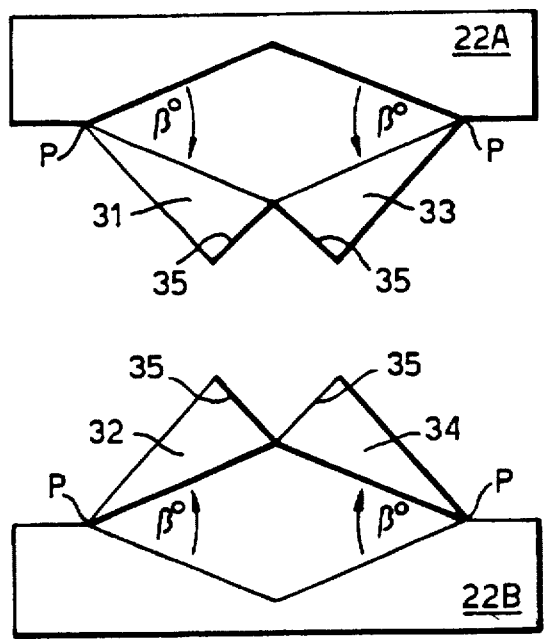

(d) The panel 22 is then separated vertically so that the two parts 22A, 22B are spaced apart and the triangular arms are pivoted about their apices at points P and are swung out away from the rest of their respective panel part 22A or 22B by an angle β, where β=A°, as shown in FIG. 2g.

Figure 2H:
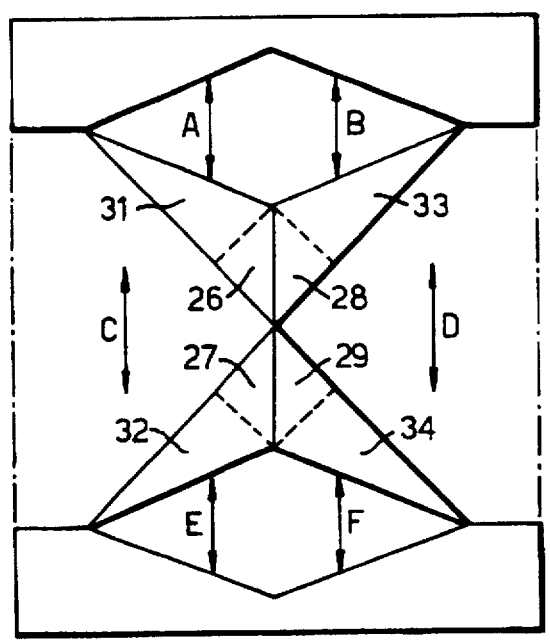

(e) The knitting pattern for the pouch (FIG. 2e) is now placed into the spacing between the four triangular arms 31–34, with the base 35 of the arms connecting to the sides of the pouch pattern to produce the final pattern shown in FIG. 2h, in which the pairs to be joined together A,B,C,D,E,F are shown by double-headed arrows, and the edges-to-be-joined together in each pair have the same length and are biased at the same angles to the horizontal.

The swinging triangular arms produce edges on the arms 31–34 and panel parts 22A and 22B, which form a diamond shaped enclosure with opposed parallel edges.

Figure 2I:
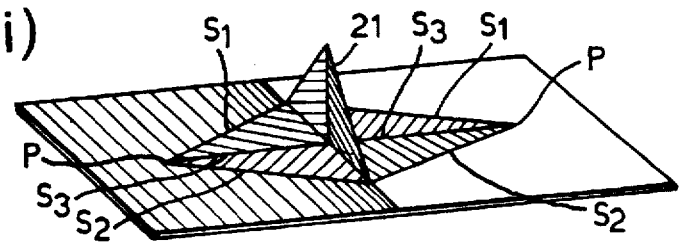

FIG. 2i shows the wale lines and suture lines in the final knitted article. It can be seen that the pouch 21 is flanked on each side by suture lines $S_1$, $S_2$ and $S_3$ that extend away from the pouch to meet at a point $P_1$. The suture lines $S_1$ and $S_2$ extend from the upper and lower course of knitting at the respective ends of the pouch 21 and form a diamond enclosure of suture lines in which the pouch 21 is located. The suture lines $S_1$ and $S_2$ correspond with the edges-to-edge joint between the triangular arms 31–34 and their adjacent respective panel parts 22A or 22B, and the suture line $S_3$ corresponds to the edge-to-edge joint between pairs of triangular arms 31, 32 and 33, 34, respectively.

Figure 3E:
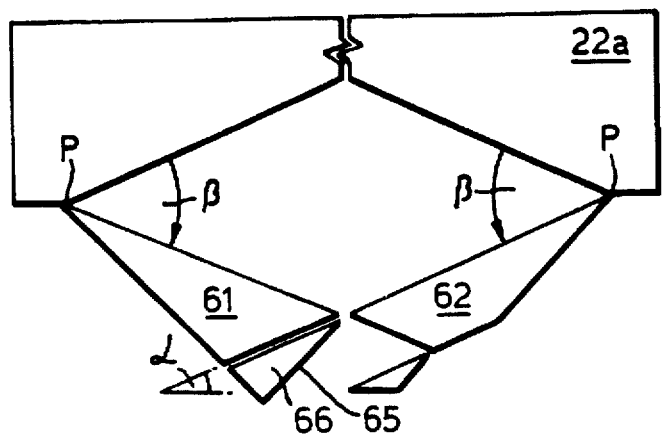
FIGS. 3(a)–3(h) disclose a second embodiment of the present invention.
Figure 3F:
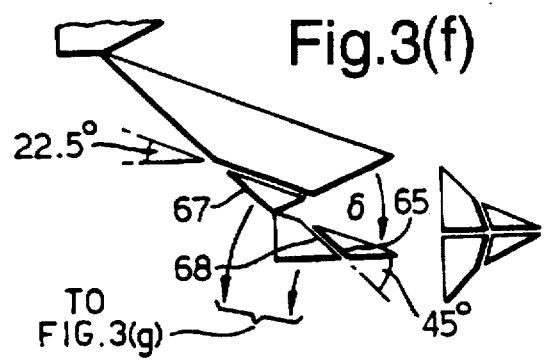
Figure 3G:
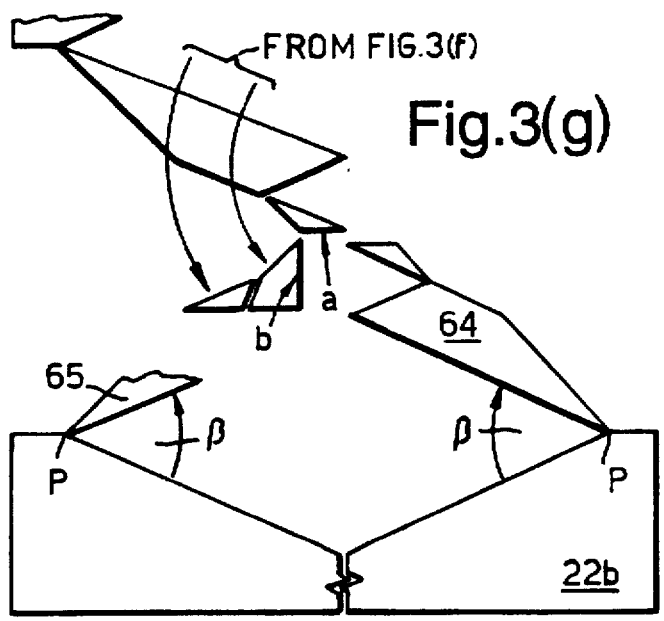
Figure 3:
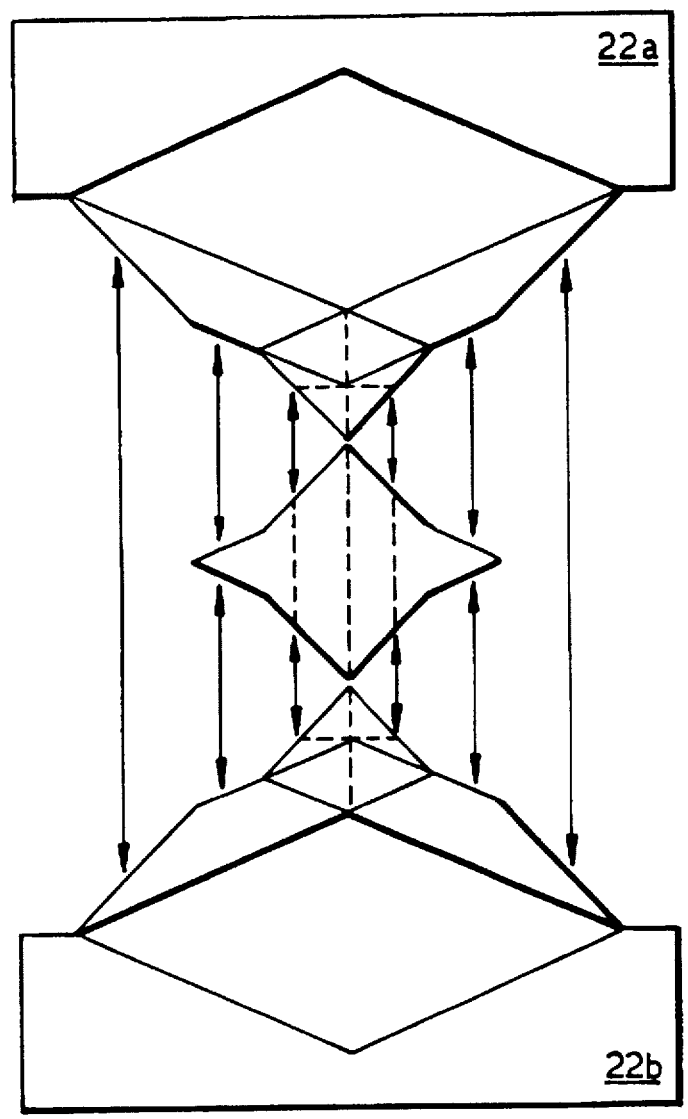

FIG. 3 illustrates a vertically orientated different pouch 51, which in this case is a narrow rectangular pouch 51 incorporated into the panel 22 (see FIG. 3a). The pouch has a height "a" and a length "L". In order to develop the knitting pattern shown in FIG. 3c, it is necessary to follow similar steps to the procedure described with reference to FIG. 2.

The pouch 51 is notionally split from the panel 22. The pouch 51 is then developed by taking its flat development as shown in FIG. 3c and performing a geometric rearrangement. Triangular portions 52, 53, 54, 55 are conveniently split off the development at an angle γ of 45° and then swung upwardly as shown in FIG. 3d. As the angle γ is 45°, the length of each end of each triangle (51-54) is "a". The edges-to-be-joined are indicated by double headed arrows and again have the same length and equal bias angles to the horizontal.

With reference to FIG. 3b, the panel 22 is also subject to geometric rearrangement and is again split horizontally into two parts 22A and 22B, and four congruent triangular arms 61-64 are split from the panel. The triangular arms 61-64 have horizontal sides formed by the horizontal split line and a base 65 with a length equal to half the length of the split into which the pouch is incorporated, and the angle α at the apices of the four triangles is equal to γ/2=22½. The two parts 22A, 22B of the panel 22 are then vertically moved apart and the triangular arms 61-64 swung out, as before, for an angle β of 45°.

Since the base 65 of each triangular arm is inclined to the horizontal and it must match with the pouch pattern (FIG. 3d), further geometric rearrangements are necessary.

Referring to FIG. 3e and in particular to the left of the center line CL, the ends 64 of the arms (61-64) are split off at angles α of 22.5° as shown in FIG. 3f and rotated through angle δ where δ=45°, so that the end faces 65 of the arms are now all essentially horizontal for connecting to a respective end of the pouch pattern.

The end face 65 of each arm has a length a+b, where a=the height of the pouch and $$b = \frac{L - 2a}{2}$$

where L is the length of the pouch (see FIG. 3d).

In order to maintain the feature that all edges to be joined have the same length and bias angle, further rearrangements are necessary. In particular, it will be necessary to remove two further portions: one portion 67 from the arms and the second portion 68 from the ends 66 of the arms, which in use does not align with the pouch pattern. The portions 67 and 68 are split off at desired angles to permit suturing in the knitting process and are transferred as shown by arrows in FIG. 3g. The final result of the rearrangement at this stage is shown to the right of the center line CL.

The final knitting pattern is shown in FIG. 3h in which the edges-to-be-joined are shown by double headed arrows and meet the criterion of same lengths and equal bias angles.

Figure 4A:
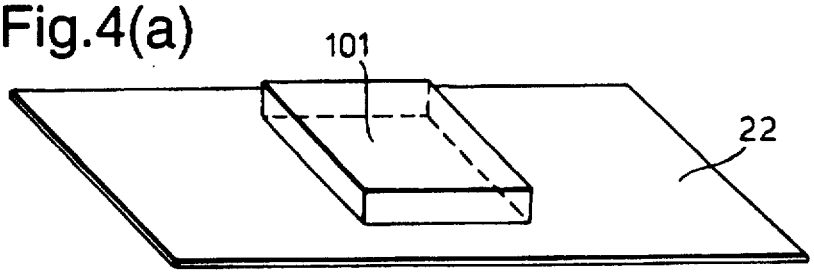
FIGS. 4(a)–4(c) disclose a third embodiment of the present invention.

FIG. 4a shows a variation on the pouch 51 in which a rectangular vertical pouch 101 is incorporated in the panel 22.

This is simply done by taking the final pattern (FIG. 3h) for the narrow pouch 51 and splitting down the vertical center line, and spreading course wise to insert the square/rectangular blank to achieve the knitting pattern 4b.

Alternatively, the final knitting pattern 4b can be developed from first principles in a similar manner to that which will be described with reference to FIG. 5.

Figure 4B:
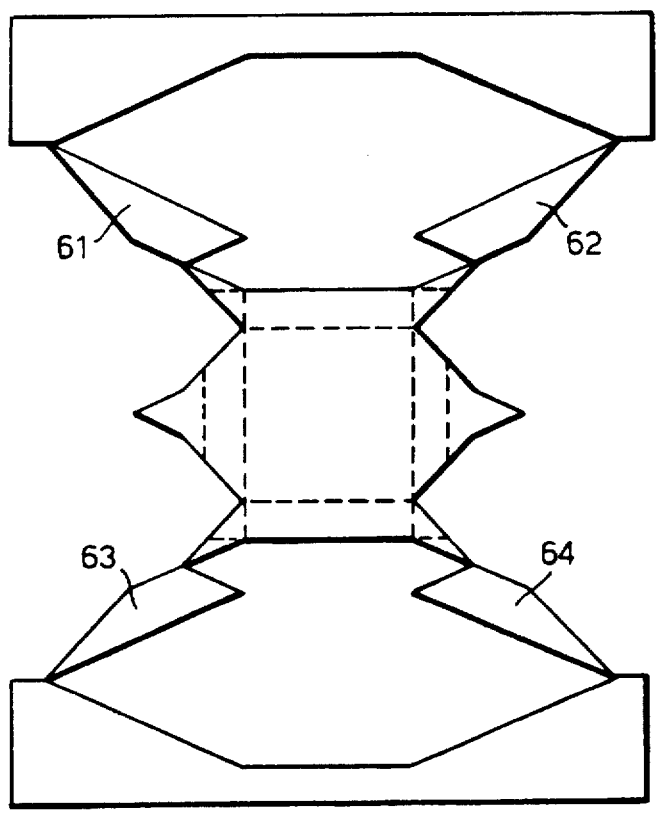
Figure 4C:
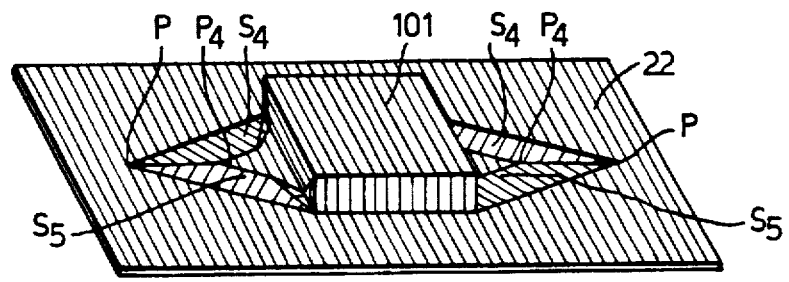

FIG. 4c discloses the continuously knitted cover showing the wale-wise directions in the cover with the suture lines. A feature of this cover is that a second pair of intersecting suture lines $S_4$ and $S_5$ are located on each side of the pouch 101 intersecting at a point $P_4$ which is nearer the pouch than the outer point P relating to the intersection of other suture lines, which correspond with the lines $S_1$, $S_2$ and $S_3$ as described with reference to FIG. 2.

The second pair of suture lines $S_4$ and $S_5$ are parallel to the suture lines $S_1$ and $S_2$, respectively, and the Point $P_4$ is located on the suture line $S_3$. Other minor suture lines corresponding to other pairs of joined edges will also be formed in the knitting process.

Referring to FIG. 5, there is shown the steps for deriving a simplified shape of the knitting pattern 4b from first principles, as discussed with reference to FIG. 3.

(a) The rectangular pouch 101 is shown on its panel 22 in 5(a).

(b) The rectangular pouch 101 is notionally removed from its panel, is developed, and undergoes some geometric rearrangements (similar to that associated with FIGS. 3c and 3d) to form the pattern for the pouch as shown in FIG. 5b.

(c) In the next step shown in FIG. 5c, the panel 22 with its rectangular aperture 102 is split horizontally into two parts 22A, 22B, and four congruent triangular arms 111, 112, 113, 114 are split from the panel as previously described.

(d) Referring to FIG. 5d, the two parts 22A, 22B of the panel 22 are then moved apart and the arms swung out by angle θ, which is typically 45° or could alternatively be 60°. The end portions 116 of the arms 111-116 are then split-off at an angle η where η=45°-θ/2.

Figure 5E:
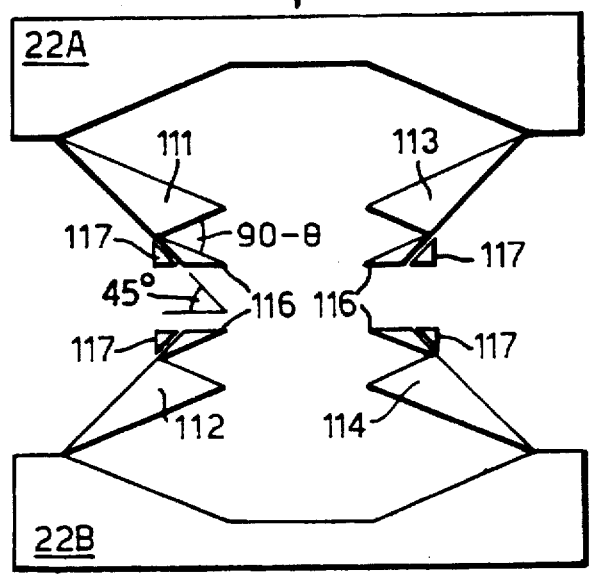

(e) In the next step shown in FIG. 5e, the end portions 116 are each rotated about an angle of 90° θ, and the portions 117 which would project beyond the pouch pattern, when incorporated, are split off at an angle of 45°. By the choice of suitable dimensions, there is no part corresponding to part 67 in FIG. 3e to split off.

Figure 5F:
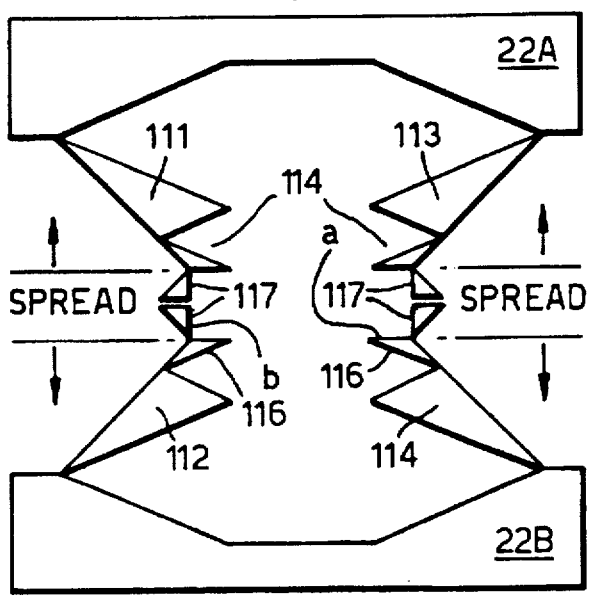

(f) The four portions 117 are then rotated through 90° as shown in FIG. 5f.

Figure 5G:
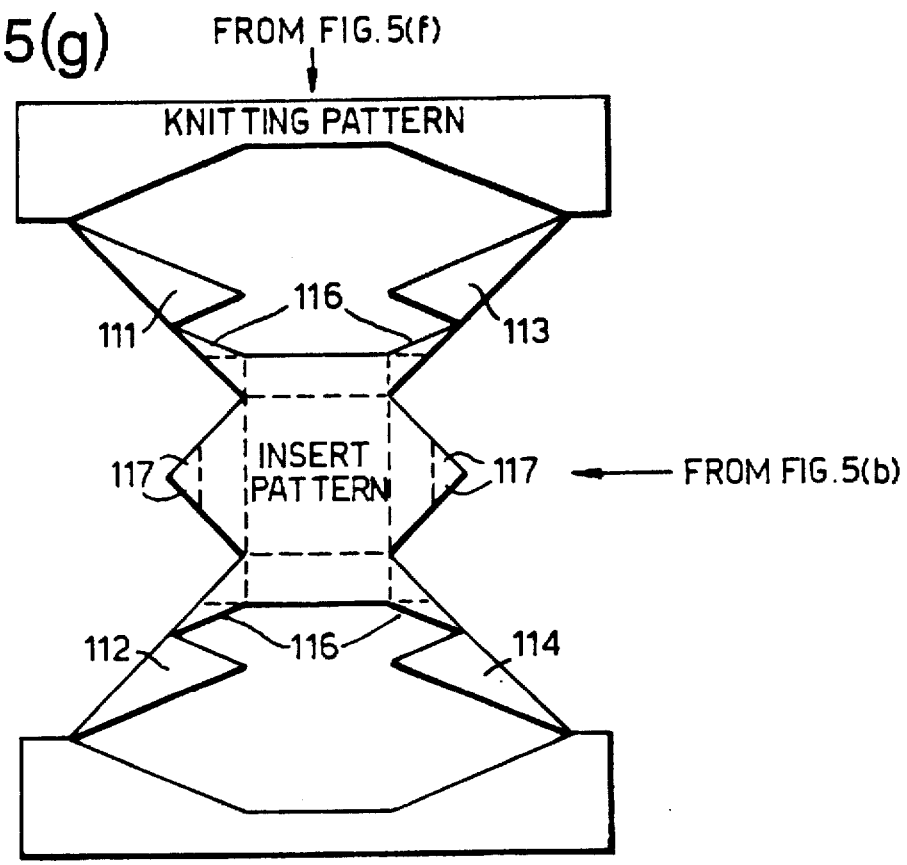

(g) Finally, as shown in FIG. 5g, the two parts 22A, 22B of the panel are further moved apart and the pouch pattern inserted and the portions 116 and 117 attached to the pouch pattern in such a manner as to meet the requirements of equal length and equal bias angle for edges-to-be-joined.

Figure 6A:
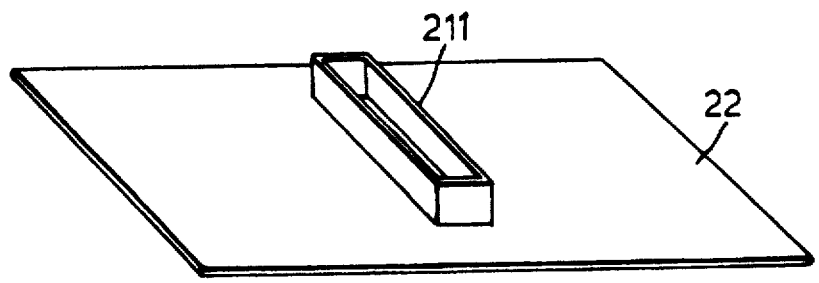
FIGS. 6(a)–6(b) disclose yet another embodiment of the invention.
Figure 6B:
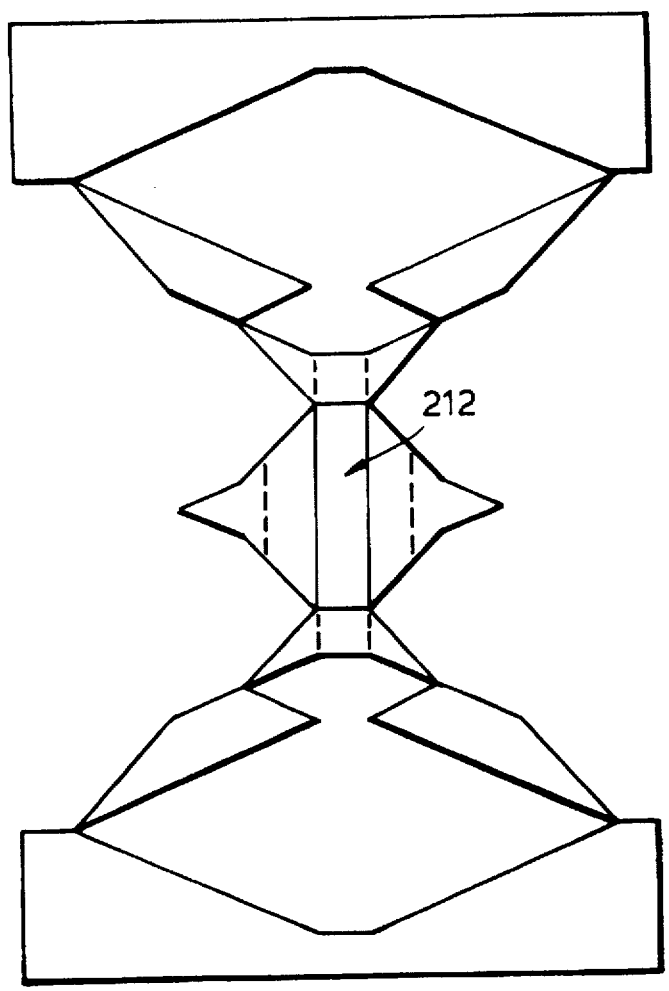

FIG. 6 illustrates an open ended rectangular pouch 211 incorporated into a panel 22. Again, the knitting pattern FIG. 6b is derived in a similar manner to that disclosed for FIG. 4 or FIG. 5 except that an aperture 212 is formed in the center of the pouch pattern. The aperture 212 could occupy the whole center as shown or part of the center, and could be any shape desired as long as it is within the boundary of the center part.

Figure 7:
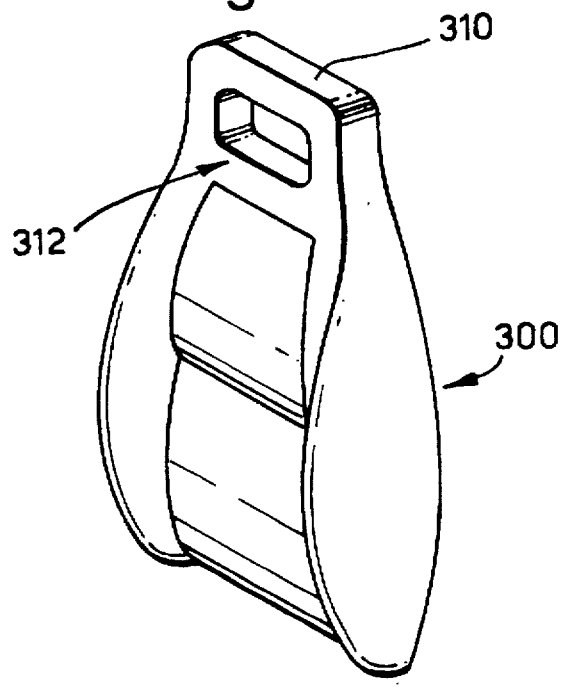
FIG. 7 shows a motor vehicle seat back including a head restraint.

An open end pouch is particularly useful in automobile seat back cushions 300, as shown in FIG. 7, and having an aperture 312 formed in the center of an integral head restraint 310, or in which an aperture (not shown) in the top of the seat back accommodates a sliding mechanism for a head restraint.

It will be appreciated that the above examples are only illustrative of the means whereby vertical or wale-wise pouches can be incorporated into a panel by a continuous knitting process. The invention is not restricted to any particular shape of pouch, for example, it could cover hexagonal pouches or asymmetric pouches, and is not restricted to pouches on flat panels but may be incorporated into covers which will be curved in one or more directions. Such covers may be incorporated into seat covers for automobile seats.

What is claimed is:

1. A three-dimensional continuously weft knitted fabric cover having a pouch formed therein, said pouch having a major axis extending in a wale-wise direction in the knitted cover, coursewise regions of said cover adjoining said pouch and said pouch being formed of an even number of two-dimensional weft knitted portions having edges joined by knit sutures such that suture lines extend from said pouch in said coursewise regions of said cover on each coursewise side of said pouch.

2. A fabric cover as claimed in claim 1 wherein the pouch is formed in a substantially flat panel and said suture lines extend away from the pouch on each side thereof to intersect at one or more points remote from the pouch.

3. A fabric cover as claimed in claim 2 wherein one pair of intersecting suture lines extend from a first knitted course and a later knitted course of each pouch.

4. A fabric cover as claimed in claim 3 wherein a third course-wise suture line passes through said points of intersection on each side of the pouch.

5. A fabric cover as claimed in claim 4 wherein a second pair of intersecting suture lines on each side of the pouch pass through a second point nearer said pouch than the respective said one point, said second suture lines being substantially parallel to said one pair of suture lines.

6. A fabric cover as claimed in claim 1 wherein the pouch is an open-ended pouch.

7. A seat for an automobile in which the seat comprises a fabric cover as claimed in claim 1.

8. A seat for an automobile in which the seat comprises a fabric cover as claimed in claim 6 in which the back cushion of the seat includes a head restraint formed from an open ended pouch.

* * * * *